United States Patent
Tu et al.

(10) Patent No.: US 12,189,129 B2
(45) Date of Patent: Jan. 7, 2025

(54) AUGMENTED REALITY DISPLAY DEVICE

(71) Applicant: Acer Incorporated, New Taipei (TW)

(72) Inventors: Tsung-Wei Tu, New Taipei (TW); Yi-Jung Chiu, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 18/356,206

(22) Filed: Jul. 20, 2023

(65) Prior Publication Data

US 2024/0168293 A1    May 23, 2024

(30) Foreign Application Priority Data

Nov. 21, 2022   (TW) .................................. 111144346

(51) Int. Cl.
*G02B 27/01*  (2006.01)
*G02B 27/00*  (2006.01)
*G02B 27/28*  (2006.01)
*G02F 1/1362*  (2006.01)

(52) U.S. Cl.
CPC ...... *G02B 27/0172* (2013.01); *G02B 27/0093* (2013.01); *G02B 27/283* (2013.01); *G02F 1/136277* (2013.01); *G02B 2027/011* (2013.01); *G02B 2027/0138* (2013.01); *G02F 2203/02* (2013.01)

(58) Field of Classification Search
CPC ............ G02B 27/0172; G02B 27/0093; G02B 27/283; G02B 2027/011; G02B 2027/0138; G02F 1/136277; G02F 2203/02
See application file for complete search history.

(56) References Cited

U.S. PATENT DOCUMENTS

| | | | |
|---|---|---|---|
| 10,768,427 B2 | 9/2020 | Ha | |
| 11,480,800 B1* | 10/2022 | Schuck | H04N 23/90 |
| 2019/0179149 A1* | 6/2019 | Curtis | G02B 27/01 |

FOREIGN PATENT DOCUMENTS

| | | |
|---|---|---|
| CN | 113574443 | 10/2021 |
| CN | 113767317 | 12/2021 |
| TW | 202026698 | 7/2020 |

* cited by examiner

*Primary Examiner* — Nathanael R Briggs
(74) *Attorney, Agent, or Firm* — JCIPRNET

(57) ABSTRACT

An augmented reality display device includes a display, a polarizing beam splitter, and a reflective liquid crystal panel. The display is configured to provide an image beam. The polarizing beam splitter is disposed on a path of the image beam. The reflective liquid crystal panel is disposed on a path of the image beam from the polarizing beam splitter. The reflective liquid crystal panel is configured to form a plurality of modulating and reflecting regions separate from each other. The modulating and reflecting regions are configured to modulate a polarized direction of the image beam and reflect the image beam back to the polarizing beam splitter. The polarizing beam splitter is configured to make the modulated image beam travel to an eye of the user. The reflective liquid crystal panel is configured to vary a pitch of the modulating and reflecting regions.

15 Claims, 4 Drawing Sheets

AUGMENTED REALITY DISPLAY DEVICE

CROSS-REFERENCE TO RELATED APPLICATION

This application claims the priority benefit of Taiwan application serial no. 111144346, filed on Nov. 21, 2022. The entirety of the above-mentioned patent application is hereby incorporated by reference herein and made a part of this specification.

BACKGROUND

Technical Field

The disclosure relates to a display device, and in particular to an augmented reality display device.

Description of Related Art

In recent years, Virtual Reality (VR) display technology and Augmented Reality (AR) display technology have developed vigorously, and there have been a variety of head-mounted display (HMD) optical systems so far. However, the current HMD has a problem of vergence-accommodation conflict (VAC).

The VAC is due to the difference between the accommodation distance of one eye and the vergence distance of both eyes, which causes confusion in the human brain and makes users dizzy easily. This problem occurs in both VR display devices and AR display devices. This problem is even more pronounced in the AR display devices, which use virtual images to interact with real objects.

One way to solve the VAC is to use a small pinhole mirror to form a virtual image and achieve the effect of long depth of field. In this way, the range of the focusing distance of the single eye is larger, covering the focusing distance of the two eyes, and then the VAC is resolved. However, when multiple pinhole mirrors are used to form a virtual image, it is easy to have the problem of crosstalk of multiple images. Assuming that there are two small mirrors to reflect the image from the image source, if the eyes are adjusted at the design value of the virtual image distance, there will be no crosstalk in the retinal imaging of the eyes. But if the eyes focus at other distances, there will be crosstalk, that is, multiple images will be generated.

SUMMARY

The invention provides an augmented reality (AR) display device, which can effectively improve the problem of image crosstalk.

An embodiment of the invention proposes an AR display device configured to be placed in front of an eye of a user. The AR display device includes a display, a polarizing beam splitter, and a reflective liquid crystal panel. The display is configured to provide an image beam. The polarizing beam splitter is disposed on a path of the image beam. The reflective liquid crystal panel is disposed on a path of the image beam from the polarizing beam splitter. The reflective liquid crystal panel is configured to form a plurality of modulating and reflecting regions separate from each other. The modulating and reflecting regions are configured to modulate a polarized direction of the image beam and reflect the image beam back to the polarizing beam splitter. The polarizing beam splitter is configured to make the modulated image beam travel to an eye of the user. The reflective liquid crystal panel is configured to vary a pitch of the modulating and reflecting regions.

In the AR display device of the embodiment of the invention, the reflective liquid crystal panel is used to form a plurality of modulating and reflecting regions separated from each other. And the pitch of these modulating and reflecting regions can be changed to adapt to the different focusing distances of the user's eyes. Therefore, the AR display device of the embodiment of the invention can effectively improve the problem of image crosstalk.

DESCRIPTION OF THE EMBODIMENTS

Figure 1:
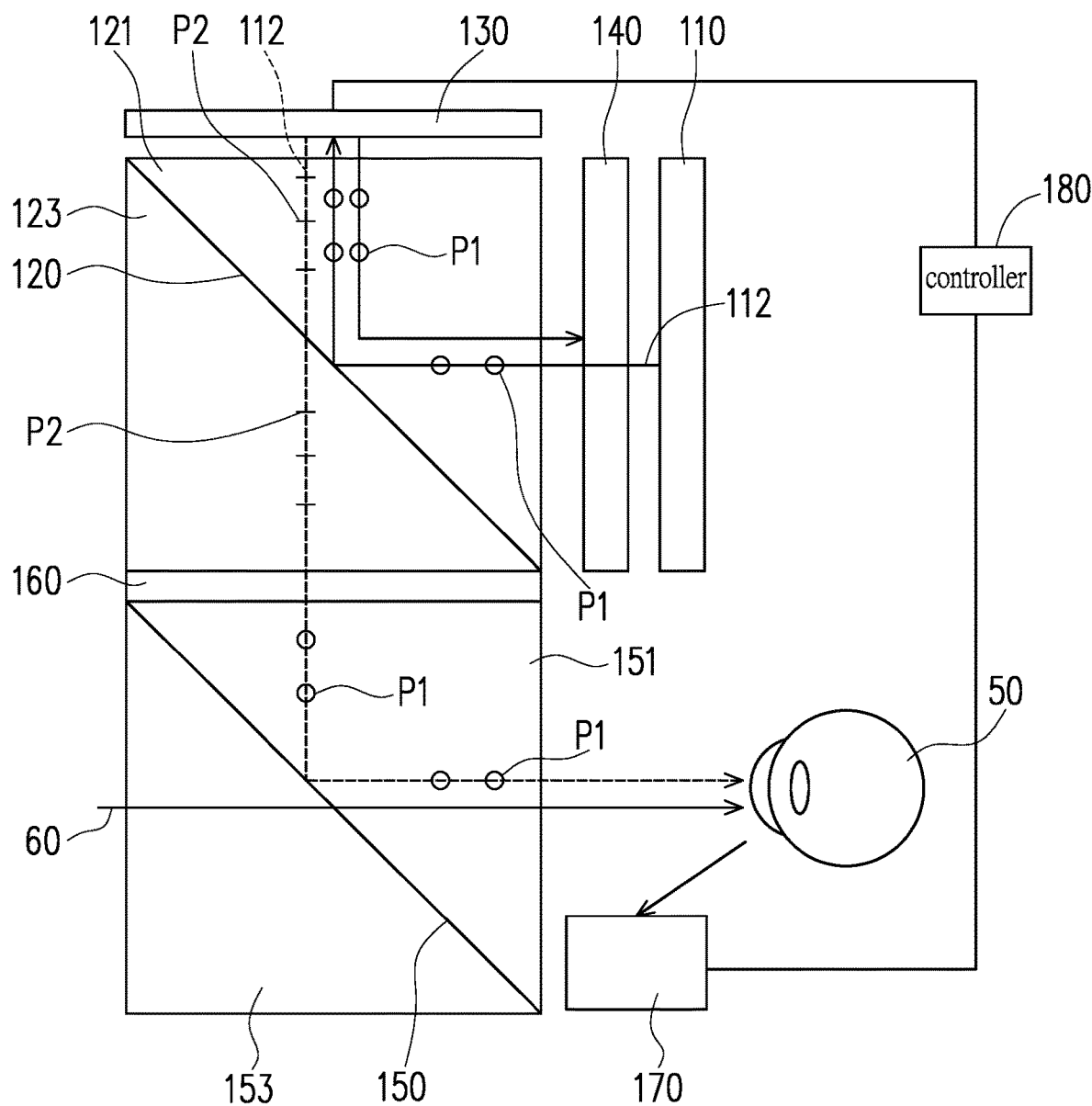
FIG. 1 is a schematic diagram of an optical path structure of an augmented reality (AR) display device according to an embodiment of the invention.
Figure 2A:
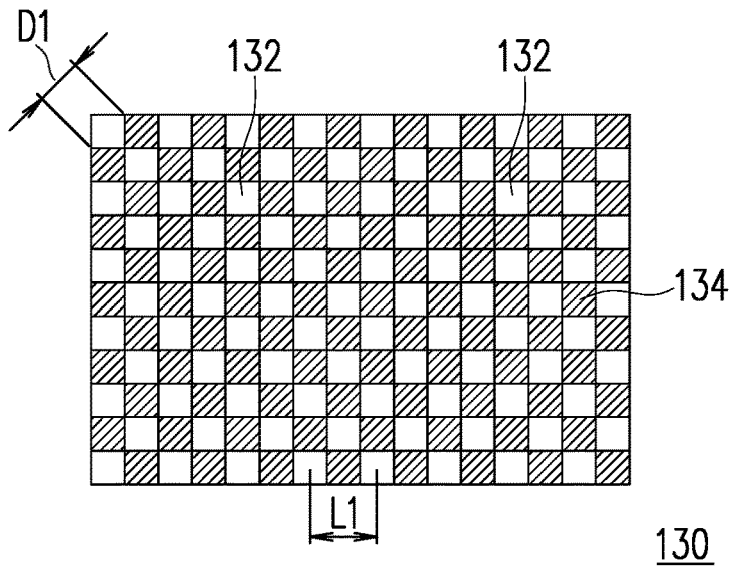
FIG. 2A, FIG. 2B and FIG. 2C are schematic front views of the distribution of modulating and reflecting regions of the reflective liquid crystal panel in FIG. 1 in three different states.
Figure 2B:
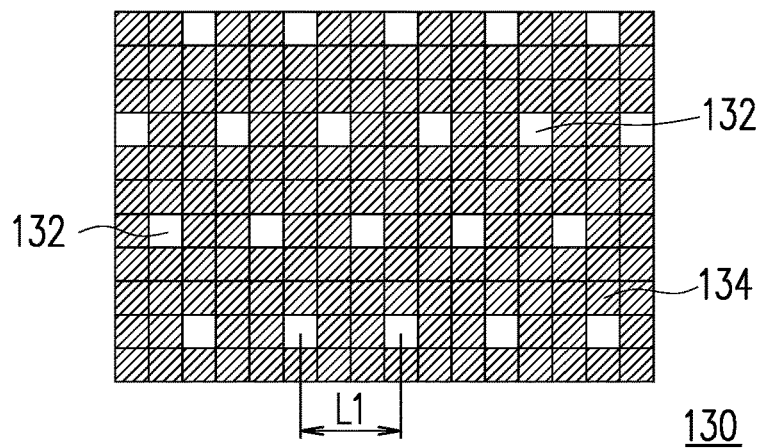
Figure 2C:
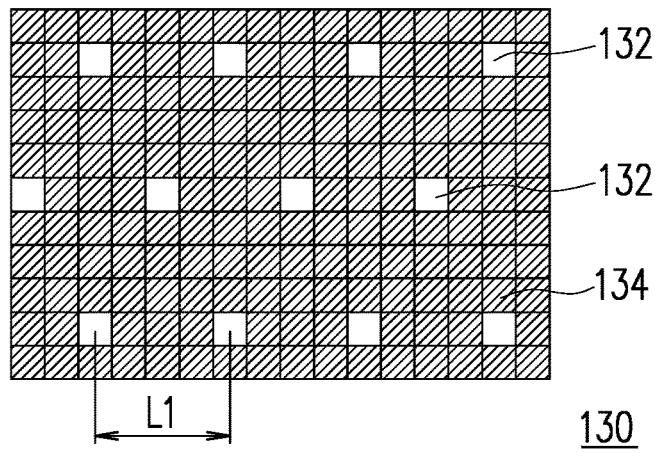

FIG. 1 is a schematic diagram of an optical path structure of an augmented reality (AR) display device according to an embodiment of the invention. And FIG. 2A, FIG. 2B and FIG. 2C are schematic front views of the distribution of modulating and reflecting regions of the reflective liquid crystal panel in FIG. 1 in three different states. Referring to FIG. 1, FIG. 2A to FIG. 2C, the AR display device 100 of the embodiment is configured to be placed in front of an eye 50 of a user. The AR display device 100 includes a display 110, a polarizing beam splitter 120 and a reflective liquid crystal panel 130. The display 110 is configured to provide an image beam 112. In the embodiment, the display 110 is, such as an organic light-emitting diode display (OLED display), a liquid crystal display, a micro light-emitting diode display (micro-LED display) or other suitable display.

The polarizing beam splitter 120 is disposed on a path of the image beam 112, and the reflective liquid crystal panel 130 is disposed on a path of the image beam 112 from the polarizing beam splitter 120. The reflective liquid crystal panel 130 is configured to form a plurality of modulating and reflecting regions 132 separate from each other. The modulating and reflecting regions 132 are configured to modulate a polarized direction of the image beam 112 and reflect the image beam 112 back to the polarizing beam splitter 120. The polarizing beam splitter 120 is configured to make the modulated image beam 112 travel to the eye 50 of the user.

In the embodiment, the AR display device 100 further includes a polarizer 140, which is disposed on the path of the image beam 112, and is located between the display 110 and the polarizing beam splitter 120. If the display 110 is an OLED display or a micro-LED display, then the display 110 emits non-polarized light. And the polarizer 140 filters the non-polarized light while passing the image beam 112 with a first polarization direction P1. If the display 110 is a liquid crystal display, and the polarizer 140 is a part of the liquid crystal display, that is, the film layer covered on the surface of the liquid crystal display. And the liquid crystal display emits the image beam 112 with the first polarization direction P1. In the embodiment, the polarizing beam splitter 120 is used to reflect the image beam 112 from the display 110 to the reflective liquid crystal panel 130, and to allow the modulated image beam 112 from the reflective liquid crystal panel 130 to penetrate.

For example, the first polarization direction P1 relative to the polarizing beam splitter 120 is, for example, the s polarization direction. Therefore, the image beam 112 filtered by the polarizer 140 and having the first polarization direction P1 will be reflected by the polarizing beam splitter 120 to the reflective liquid crystal panel 130. The modulating and reflecting regions 132 of the reflective liquid crystal panel 130 form the effect of a quarter-wave plate through the configuration of the liquid crystal alignment direction achieved by applying an electric field or not applying an electric field. Therefore, after the image beam 112 with the first polarization direction P1 passes through the liquid crystal layer of the modulating and reflecting regions 132 in sequence, is reflected by the reflective layer at the bottom of the liquid crystal layer and passes through the liquid crystal layer of the modulating and reflecting regions 132 again, it will become having a second polarization direction P2. The second polarization direction P2 relative to the polarizing beam splitter 120 is, for example, the p polarization direction. And the polarizing beam splitter 120 is adapted to allow the image beam 112 with the second polarization direction P2 to penetrate. On the other hand, the reflective liquid crystal panel 130 in other regions 134 other than the modulating and reflecting regions 132 does not apply an electric field or through an electric field to achieve another configuration of liquid crystal alignment direction, thus forming a transparent layer without phase retardation effect. In this way, after the image beam 112 with the first polarization direction P1 passes through the liquid crystal layer of other regions 134 in sequence, is reflected by the reflective layer at the bottom of the liquid crystal layer and passes through the liquid crystal layer of other regions 134 again, it will maintain the original first polarization direction P1. The reflected image beam 112 with the first polarization direction P1 will be blocked (i.e. reflected) by the polarizing beam splitter 120 and will not enter the eye 50. Therefore, the role of the reflective liquid crystal panel 130 plus the polarizing beam splitter 120 is equivalent to treating the modulating and reflecting regions 132 as a small pinhole mirror to reflect the image beam 112 from the display 110. Then, the image beam 112 reflected by the pinhole mirror is transmitted to the eye 50 of the user. In the embodiment, the reflective liquid crystal panel 130 is, such as a liquid-crystal-on-silicon panel (LCOS panel).

In the embodiment, the AR display device 100 further includes an optical splitter 150, which is disposed on the path of the modulated image beam 112 from the polarizing beam splitter 120 for reflecting at least part of the modulated image beam 112 to the eye and for at least part of light 60 from outside to pass through to the eye 50. In the embodiment, the optical splitter 150 is another polarizing beam splitter, and the AR display device 100 further includes a half-wave plate 160, which is disposed on the path of the modulated image beam 112 from the polarizing beam splitter 120 and is located between the polarizing beam splitter 120 and the optical splitter 150. For example, after the image beam 112 from the polarizing beam splitter 120 and having the second polarization direction P2 (that is, the p polarization direction) passes through the half-wave plate 160, its polarization direction will be converted to the first polarization direction P1 by the half-wave plate 160. The first polarization direction P1 is the s polarization direction relative to the optical splitter 150. The image beam 112 from the half-wave plate 160 with the first polarization direction P1 will be reflected to the eye 50 by the optical splitter 150 (i.e. polarizing beam splitter), so that the user can see the virtual image (that is the image provided by the display 110) in front of the eye. On the other hand, the optical splitter 150 (that is, the polarizing beam splitter) will allow part of the light 60 from outside to penetrate (for example, allow the part of the light 60 from outside to have a p-polarization direction to pass through) and pass it to the eye 50. In this way, the eye 50 of the user can simultaneously see the virtual image (that is, the image provided by the display 110) and external objects, thereby achieving the effect of augmented reality.

In other embodiments, the optical splitter 150 may also be a partially penetrating partial reflector (such as a semi-penetrating half-reflector), and the AR display device 100 does not include the half-wave plate 160. And part of the image beam 112 from the polarizing beam splitter 120 with the second polarization direction P2 is reflected by the optical splitter 150 to the eye 50. On the other hand, part of the light 50 from outside penetrates the optical splitter 150 and is delivered to the eye 50.

In the embodiment, the reflective liquid crystal panel 130 is used to change the pitch L1 of the modulating and reflecting regions 132. Specifically, the reflective liquid crystal panel 130 has a plurality of pixels arranged in an array, and various distributions of the modulating and reflecting regions 132 can be generated by applying or not applying voltage to these pixels. And the three distributions are similar to the distributions in FIG. 2A, FIG. 2B and FIG. 2C. Different pitch L1 can adapt to different focusing distances of the eye 50 of the user, so that the image beam 112 reflected by the modulating and reflecting regions 132 will not generate image crosstalk (that is, multiple images partially overlap or separate from each other) on the retina of the user's eye. Therefore, the AR display device 100 of the embodiment effectively improve the problem of image crosstalk. And the modulating and reflecting regions 132 can simulate the optical effect of a small pinhole mirror to achieve the pinhole imaging of the image beam 112, so it can effectively avoid vergence-accommodation conflict (VAC). In an embodiment, the maximum outer diameter D1 (such as, the diagonal length of the modulating and reflecting regions 132) of each of the modulating and reflecting regions 132 is within the range of 0.5 mm to 4 mm, so that the modulating and reflecting regions 132 can effectively simulate a small pinhole mirror. In an embodiment, the minimum size of each of the modulating and reflecting regions 132 may be the size of one pixel of the reflective liquid crystal panel 130. For example, the minimum value of the diagonal length of each of the modulating and reflecting regions 132 may be the diagonal length of one pixel of the reflective liquid crystal panel 130.

In the embodiment, the polarizing beam splitter 120 can be sandwiched between a prism 121 and a prism 123, the optical splitter 150 can be sandwiched between a prism 151 and a prism 153, and the half-wave plate 160 can be sandwiched between the prism 123 and the prism 151, but the invention is not limited thereto. In another embodiment, the AR display device 100 may not have the prisms 121, 123, 151 and 153.

In the embodiment, the AR display device 100 further includes a camera 170 for photographing the eye 50 to obtain a focusing distance of the eye 50. Besides, in the embodiment, the AR display device 100 further includes a controller 180, which is electrically connected to the camera 170 and the reflective liquid crystal panel 130. The controller 180 receives the image signal captured by the camera 170, and the controller 180 can calculate the focusing distance of the eye 50 according to the position of the pupil of the eye 50 captured by the camera 170. Alternatively, an infrared light source can be used to emit infrared light to the eye 50, and the camera 170 (such as an infrared light camera) can be used to capture infrared light spots in the eye 50, and the controller 180 can be used to calculate the focusing distance of the eye 50. After the controller 180 calculates the focusing distance, it can command the reflective liquid crystal panel 130 to display the modulating and reflecting regions 132 distribution of the pitch L1 which is suitable for the focusing distance. In this way, the eye 50 will not see multiple images at this focusing distance.

In another embodiment, the AR display device 100 may not have the camera 170, and the controller 180 is electrically connected to the reflective liquid crystal panel 130 and the display 110. The reflective liquid crystal panel 130 sequentially displays the distribution of the modulating and reflecting regions 132 with different pitches L1, and the display 110 corresponds to these different pitches L1 and respectively displays images suitable for the focusing distance of the pitch L1. Since the reflective liquid crystal panel 130 changes the pitch L1 fast enough, through the phenomenon of persistence of vision, the user will feel that these images corresponding to these pitches are displayed simultaneously. This effect is equivalent to that the user's eyes can choose which focus distance image to see.

In an embodiment, the controller 180 is, such as a central processing unit (CPU), a microprocessor, a digital signal processor (DSP), a programmable controller, a programmable logic device (PLD), or other similar devices or combinations of these devices, but the invention is not limited thereto. Besides, in an embodiment, each function of the controller 180 may be implemented as a plurality of program codes. These program codes will be stored in a memory and executed by the controller 180. Alternatively, in an embodiment, each function of the controller 180 may be implemented as one or more circuits. The invention does not limit the implementation of the functions of the controller 180 by means of software or hardware.

Figure 3:
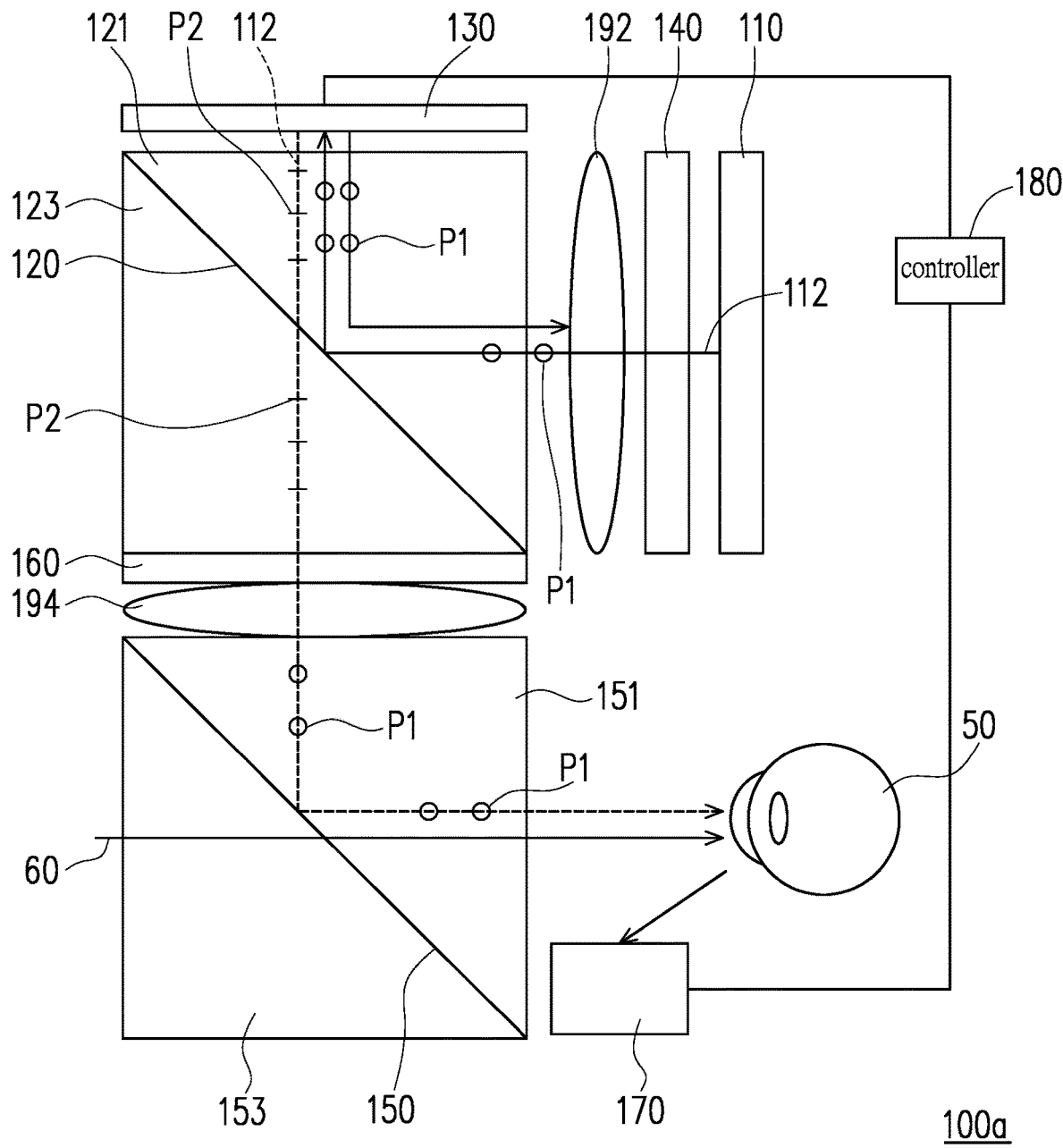
FIG. 3 is a schematic diagram of the optical path structure of the AR display device according to another embodiment of the invention.

FIG. 3 is a schematic diagram of the optical path structure of the AR display device according to another embodiment of the invention. Referring to FIG. 3, the AR display device 100a of the embodiment is similar to the AR display device 100 of FIG. 1, and the differences between the two are described below. The AR display device 100a of the embodiment includes a lens 192, which is disposed on the path of the image beam 112 and is located between the polarizer 140 and the polarizing beam splitter 120. Besides, in the embodiment, the AR display device 100a further includes a lens 194, which is disposed on the path of the modulated image beam 112 from the half-wave plate 160 and is located between the half-wave plate 120 and the optical splitter 150. The lens 192 and the lens 194 can achieve the effect of collimating or converging the image beam 112.

Figure 4:
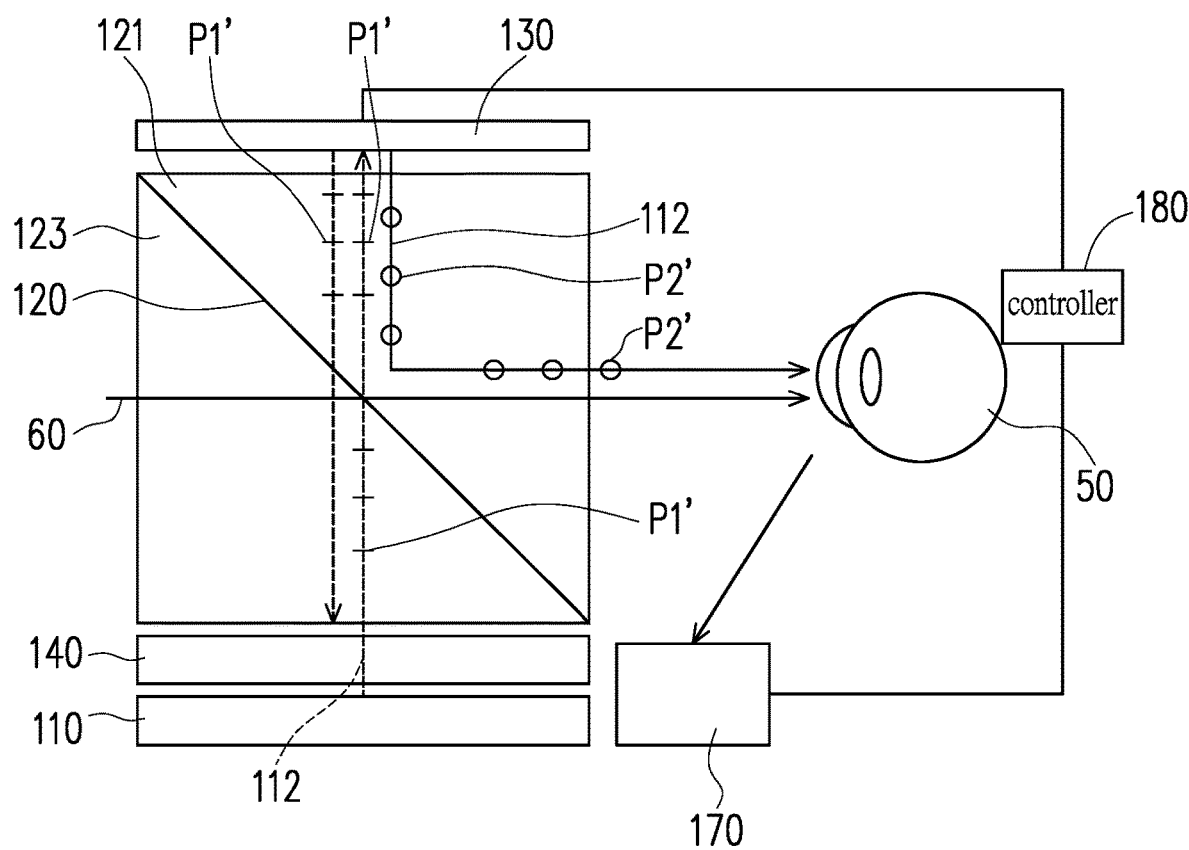
FIG. 4 is a schematic diagram of the optical path structure of the AR display device according to another embodiment of the invention.

FIG. 4 is a schematic diagram of the optical path structure of the AR display device according to another embodiment of the invention. Referring to FIG. 4, the AR display device 100b of the embodiment is similar to the AR display device 100 of FIG. 1, and the differences between the two are described below. In the AR display device 100b of the embodiment, the polarizing beam splitter 120 is used to allow the image beam 112 from the display 110 to pass through to the reflective liquid crystal panel 130 and is used to reflect the modulated image beam 112 from the reflective liquid crystal panel 130 to the eye 50. And the polarizing beam splitter 120 is used for allowing at least part of the light 60 from outside to pass through to the eye 50.

Specifically, in the embodiment, after passing through the polarizer 140, the image beam 112 from the display 110 will be filtered by the polarizer 140 into the image beam 112 with the first polarization direction P1'. The first polarization direction P1' is the p polarization direction for the polarizing beam splitter 120. Therefore, the image beam 112 with the first polarization direction P1' will pass through the polarizing beam splitter 120 to the reflective liquid crystal panel 130.

The modulating and reflecting regions 132 of the reflective liquid crystal panel 130 achieve the effect of a quarter-wave plate through the configuration of the liquid crystal alignment direction achieved by applying an electric field or without applying an electric field. Therefore, after the image beam 112 with the first polarization direction P1' passes through the liquid crystal layer of the modulating and reflecting regions 132 in sequence, is reflected by the reflective layer at the bottom of the liquid crystal layer and passes through the liquid crystal layer of the modulating and reflecting regions 132 again, it will become having a second polarization direction P2'. The second polarization direction P2' is, for example, the s polarization direction for the polarizing beam splitter 120, and the polarizing beam splitter 120 is adapted to reflect the image beam 112 with the second polarization direction P2' to the eye 50. On the other hand, the reflective liquid crystal panel 130 in the other regions 134 other than the modulating and reflecting regions 132 does not apply an electric field or achieve another configuration of liquid crystal alignment direction through an electric field, so as to form a transparent layer without phase retardation effect. In this way, after the image beam 112 with the first polarization direction P1 passes through the liquid crystal layer of other regions 134 in sequence, is reflected by the reflective layer at the bottom of the liquid crystal layer and passes through the liquid crystal layer of other regions 134 again, it will maintain the original first polarization direction P1'. Therefore, the reflected image beam 112 with the first polarization direction P1' will penetrate the polarizing beam splitter 120 and not enter the eye 50.

Compared with the AR display device 100 in FIG. 1, the AR display device 100b of this embodiment omits the optical splitter 150, so the architecture is more streamlined.

In summary, in the AR display device of the embodiment of the invention, the reflective liquid crystal panel is used to form a plurality of modulating and reflecting regions separated from each other. And the pitch of these modulating and reflecting regions can be changed to adapt to the different focusing distances of the user's eyes. Therefore, the AR display device of the embodiment of the invention can effectively improve the problem of image crosstalk.

What is claimed is:

1. An augmented reality (AR) display device configured to be placed in front of an eye of an user, the AR display device comprises:
   a display, configured to provide an image beam;
   a polarizing beam splitter, disposed on a path of the image beam; and
   a reflective liquid crystal panel, disposed on a path of the image beam from the polarizing beam splitter, wherein the reflective liquid crystal panel is configured to form a plurality of modulating and reflecting regions separate from each other, the modulating and reflecting regions are configured to modulate a polarized direction of the image beam and reflect the image beam back to the polarizing beam splitter, the polarizing beam splitter is configured to make the modulated image beam travel to an eye of the user, and the reflective liquid crystal panel is configured to vary a pitch of the modulating and reflecting regions, and wherein the plurality of modulating and reflecting regions separate from each other are configured to serve as a plurality of pinhole mirrors separate from each other.

2. The AR display device according to claim 1, wherein the maximum outer diameter of each of the modulating and reflecting regions is within the range of 0.5 mm to 4 mm.

3. The AR display device according to claim 1, further comprises a polarizer, which is disposed on the path of the image beam and is located between the display and the polarizing beam splitter.

4. The AR display device according to claim 3, further comprises a lens, which is disposed on the path of the image beam and is located between the polarizer and the polarizing beam splitter.

5. The AR display device according to claim 3, wherein the polarizer linearly polarizes the image beam to have a first polarization direction.

6. The AR display device according to claim 5, wherein the first polarization direction is an s polarization direction with respect to the polarizing beam splitter.

7. The AR display device according to claim 1, further comprises an optical splitter disposed on the path of the modulated image beam from the polarizing beam splitter for reflecting at least part of the modulated image beam to the eye and for at least part of light from outside to pass through to the eye.

8. The AR display device according to claim 7, wherein the optical splitter is another polarizing beam splitter, and the AR display device further comprises a half-wave plate, which is disposed on the path of the modulated image beam from the polarizing beam splitter and is located between the polarizing beam splitter and the other polarizing beam splitter.

9. The AR display device according to claim 8, further comprises a lens, which is disposed on the path of the modulated image beam from the half-wave plate and is located between the half-wave plate and the other polarizing beam splitter.

10. The AR display device according to claim 1, further comprises a camera for photographing the eye to obtain a focusing distance of the eye.

11. The AR display device according to claim 1, wherein the polarizing beam splitter is used to reflect the image beam from the display to the reflective liquid crystal panel, and to allow the modulated image beam from the reflective liquid crystal panel to penetrate.

12. The AR display device according to claim 1, wherein the polarizing beam splitter is used to transmit the image beam from the display to the reflective liquid crystal panel, and is used to reflect the modulated image beam from the reflective liquid crystal panel to the eye, and the polarizing beam splitter is used to allow at least part of the light from outside to pass through to the eye.

13. The AR display device according to claim 1, wherein the reflective liquid crystal panel is a liquid-crystal-on-silicon panel.

14. The AR display device according to claim 1, wherein the display is an organic light-emitting diode display, a liquid crystal display, or a micro light-emitting diode display.

15. The AR display device according to claim 1, wherein the modulating and reflecting regions of the reflective liquid crystal panel form an effect of a quarter-wave plate through a configuration of a liquid crystal alignment direction achieved by applying an electric field or not applying an electric field.

* * * * *